（12） United States Patent
Sato et al.

(10) Patent No.: US 7,357,320 B2
(45) Date of Patent: Apr. 15, 2008

(54) INFORMATION CARRIER READER/WRITER, METHOD AND APPARATUS FOR SUPPORTING THE SAME

(75) Inventors: Masahiko Sato, Handa (JP); Kiyoshi Takahashi, Hekinan (JP); Takayuki Komatsu, Kariya (JP); Masashi Kamiya, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 256 days.

(21) Appl. No.: 11/106,686

(22) Filed: Apr. 15, 2005

(65) Prior Publication Data

US 2005/0230475 A1  Oct. 20, 2005

(30) Foreign Application Priority Data

Apr. 16, 2004 (JP) ............................. 2004-121396

(51) Int. Cl.
*G06K 7/08* (2006.01)
(52) U.S. Cl. ...................... 235/451; 235/492
(58) Field of Classification Search ................ 235/451, 235/492, 380
See application file for complete search history.

(56) References Cited

U.S. PATENT DOCUMENTS

| | | | |
|---|---|---|---|
| 5,581,708 A * | 12/1996 | Iijima ........................ 710/11 |
| 5,594,233 A * | 1/1997 | Kenneth et al. ............ 235/492 |
| 5,952,935 A | 9/1999 | Mejia et al. |
| 6,360,952 B1 * | 3/2002 | Kimlinger et al. .......... 235/492 |
| 6,400,272 B1 | 6/2002 | Holtzman et al. |
| 6,577,229 B1 * | 6/2003 | Bonneau et al. ......... 340/10.41 |
| 6,585,155 B2 * | 7/2003 | Nishimura ................... 235/381 |
| 6,617,962 B1 | 9/2003 | Horwitz et al. |
| 6,698,654 B1 | 3/2004 | Zuppicich |
| 6,839,772 B1 * | 1/2005 | Kowalski et al. .............. 710/5 |
| 6,899,270 B2 * | 5/2005 | Obayashi et al. ........... 235/451 |
| 6,934,842 B2 * | 8/2005 | Okamoto et al. ........... 713/168 |

FOREIGN PATENT DOCUMENTS

JP  8-305654  11/1996

OTHER PUBLICATIONS

Preliminary Search Report from French Patent Office issued on Apr. 5, 2006 for the corresponding French patent application No. FR 0503868.

* cited by examiner

*Primary Examiner*—Ahshik Kim
(74) *Attorney, Agent, or Firm*—Posz Law Group, PLC

(57) ABSTRACT

In a reader/writer, a storage unit is configured to store a plurality of parameter files each including a plurality of control parameters required to communications. The parameter files meet the communication characteristics. An identifying unit is configured to try to communicate with the at least one of the information carriers based on every parameter file to identify that one of the parameter files meets the communication characteristic of the at least one of the information carriers based on the tried result.

11 Claims, 8 Drawing Sheets

FIG. 2

| | | PARAMETER-FILE IDENTIFICATION CODE | | |
|---|---|---|---|---|
| | | PARAMETER-FILE SPECIFICATION CODE | | |
| | | FILE-ORDER IDENTIFICATION CODE | | |
| CB | \multicolumn{4}{l|}{CARRIER-CONTROL PARAMETER DESCRIPTION BLOCK} |
| | N | EFFECTIVE NUMBER OF PARAMETERS IN THIS BLOCK | | |
| | CS | CARRIER SWEEP FROM WHICH CARRIER SIGNAL IS IN OFF TO WHICH IT REACHES 90% OF MAXIMUM OUTPUT LEVEL (100%) | | |
| | OR | REQUEST WAITING TIME INTERVAL FROM WHICH CARRIER SIGNAL REACHES 90% LEVEL TO TIMING AT WHICH DATA SIGNAL IS SUPERIMPOSED THEREON | | |
| | RC | CARRIER-OFF TIME INTERVAL DURING WHICH CARRIER SIGNAL IS LOWER THAN PREDETERMINED LEVEL WHEN IT IS CYCLED ON/OFF | | |
| | RT | MAXIMUM NUMBER OF RETRIES FOR EACH COMMUNICATION | | |
| TB | \multicolumn{4}{l|}{TRANSMITTING-CONTROL PARAMETER DESCRIPTION BLOCK} |
| | N | EFFECTIVE NUMBER OF PARAMETERS IN THIS BLOCK | | |
| | MP | MAXIMUM POWER | | |
| | CP | POWER REQUIRED FOR EACH COMMAND | | |
| | | N | NUMBER OF COMMANDS EACH REQUIRED TO CONTROL ITS POWER | |
| | | A | 60% | |
| | | B | 80% | |
| | | C | 65% | |
| | MV | OPTIMUM VALUE OF MODULATION INDEX | | |
| RB | \multicolumn{4}{l|}{RECEIVING-CONTROL PARAMETER DESCRIPTION BLOCK} |
| | N | EFFECTIVE NUMBER OF PARAMETERS IN THIS BLOCK | | |
| | NT | FIRST NOISE PATTERNS OCCUR WITH RESPONSE SIGNAL | | |
| | NP | SECOND NOISE PATTERNS FOR REDUCING FIRST NOISE PATTERNS | | |
| | RC | MINIMUM TIME INTERVAL FROM END OF TRANSMISSION OF COMMAND TO RECEIVING OF RESPONSE SIGNAL CORRESPONDING TO TRANSMITTED COMMAND | | |

FIG. 6A

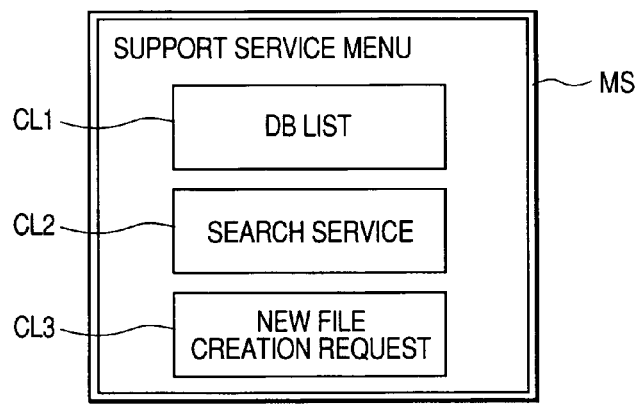

FIG. 6B

| PLASE CHECKMARK IN "WISH" BOXES AND "OPERATION" AND CLICK "OK" ||||||||
|------|-------|--------|------|------------------|---------------------|------|----------------------|
| WISH | OPERATION ||| CARD STANDARD | BRAND/USE NAME | MFR | REMARKS |
|      | TOUCH | INSERT | GATE |                  |                     |      |                      |
|      |       |        |      | ISO14443 Type A  | M****               | Fi****| *****INTRODUCTION   |
|      |       |        |      | +++++++++        | ++++                | ++++ | ++++                 |
| ✗    | ✗     |        |      | ISO14443 Type B  | JPKI                | ++++ | JPKI CARD            |
|      |       |        |      | +++++++++        | ++++                | ++++ | ++++                 |
| ✗    |       | ✗      |      | ISO14443 Type B  | RESIDENT REGISTY    | ++++ | RESIDENT REGISTY CARD|
|      |       |        |      | +++++++++        | ++++                | ++++ | ++++                 |
|      |       |        |      | ORIGINAL         | Fe****              | ++++ | PRIVATE CARD         |
|      |       |        |      | +++++++++        | ++++                | ++++ | ++++                 |

CONFIRMATION SCREEN
* * * * * * * * * * * * * * *
* * * * * * * * * * * * * * *
DOWNLOAD

PLEASE COMPLETE AND CHECK NECESSARY INFORMATION AND CLICK "OK"

CARD TYPE
☐ ISO14443 Type A
■ ISO14443 Type B
☐ JPN PROPOSAL
☐ UNKNOWN

CARD MFR
☐ ○○ PRINTING
☐ △△ INDUSTRY CO. LTD
☐ ****
■ UNKNOWN

USE
☐ INSERT
■ TOUCH
☐ TOUCH AND GO

REQUIRED COMMUNICATION DISTANCE
☐ ~10mm
■ ~50mm
☐ ~100mm
☐ ANY MORE

OK

RS

INFORMATION CARRIER READER/WRITER, METHOD AND APPARATUS FOR SUPPORTING THE SAME

CROSS REFERENCE TO RELATED APPLICATION

This application is based on Japanese Patent Application 2004-121396 filed on Apr. 16, 2004 and claims the benefit of priority therefrom, so that the descriptions of which are all incorporated herein by reference.

BACKGROUND OF THE INVENTION

1. Field of the Invention

The present invention relates to a reader/writer configured to communicate with an information carrier, such as an IC (integrated circuit) card, and a method and an apparatus, which support a reader/writer so that it communicates with an information carrier.

2. Description of the Related Art

A reader/writer for noncontact IC cards communicates with a noncontact IC card as an information carrier via radio waves to send or receive data therewith, Such reader/writers are adjusted before shipment to obtain desired communication characteristics and functions.

On the other hand, Japanese Unexamined Patent Publication No. H8-305654 discloses a personal computer integrated with a card slot and a flash memory. The personal computer is operative to identify the type of card installed in the card slot to retrieve driver software corresponding to the identified card type from the flash memory. When no driver corresponding to the identified card type is stored in the flash memory, the personal computer downloads the driver corresponding to the identified card type from an external terminal through a parallel interface.

Noncontact IC cards that are a communication target carrier of noncontact reader/writers have predetermined communication specifications and predetermined communication standards, respectively. For example, the communication standards for noncontact IC cards include ISO/IEC14443 with different specifications of type A and type B. Communication characteristics have been differently determined for the different specifications of ISO/IEC14443 type A and type B, respectively.

IC cards with the same standard and specification have different communication characteristics in cases where the manufacturers thereof are different from one another.

The communication characteristics of an IC card depend largely on the circumstances under which the IC card is used. For example, the circumstances include various environments under which an IC card is used, such as an office environment and an outdoor environment. In addition, the circumstances include various access systems of the IC card with respect to a reader/writer, such as an insertion system, a touch system, and a touch and go system.

These descriptions make it clear that, even if IC cards whose manufacturers are the same have the same standard and specifications, the IC cards have different communication characteristics in cases where they are used under different circumstances, respectively.

Reader/writers require that they successfully communicate with any IC cards whose communication characteristics are different from one another. It may be difficult for the techniques disclosed in the Japanese Non-examined Patent Publication set forth above to meet such a requirement.

SUMMARY OF THE INVENTION

The present invention has been made on the background above so that at least one preferable embodiment of the present invention provides a reader/writer communicable successfully with a plurality of noncontact information carriers having different communication characteristics from one another.

Another preferable embodiment of the present invention provides a method and an apparatus, which are capable of providing communication control information to a reader/writer; this communication control information allows the reader/writer to communicate successfully with a plurality of noncontact information carriers having different communication characteristics from one another.

According to one aspect of the present invention, there is provided a reader/writer for communications with at least one of information carriers whose communication characteristics are different from one another. The reader/writer comprises a storage unit configured to store a plurality of parameter files each including a plurality of control parameters required to the communications. The parameter files meet the communication characteristics, respectively. An identifying unit is configured to try to communicate with the at least one of the information carriers based on every parameter file to identify that one of the parameter files meets the communication characteristic of the at least one of the information carriers based on the tried result.

According to another aspect of the present invention, there is provided a supporting apparatus for supporting communications of a reader/writer with at least one of information carriers whose communication characteristics are different from one another. The supporting apparatus comprises a database configured to store a plurality of parameter files each including a plurality of control parameters required to the communications. The parameter files meet communication characteristics, respectively. A retrieving unit is configured to, when information including an identifier of one of the information carriers and a status of the one of the information carriers to be used is entered, retrieve one of the parameter files based on the entered information.

According to a further aspect of the present invention, there is provided a supporting apparatus for supporting communications of a reader/writer with noncontact information carriers. The supporting apparatus comprises a database configured to store a relationship between communication conditions and a plurality of control parameters required to the communications. The communication conditions includes communication standards adopted by the noncontact information carriers; manufacturers by which the noncontact information carriers are manufactured; uses of the noncontact information carriers; and communication distance ranges between the noncontact information carriers and the reader/writer. A retrieving unit is configured to, when one of the communication conditions is entered, retrieve at least one of the control parameters that corresponds to the one of the communication conditions based on the relationship between the communication conditions and the plurality of control parameters.

According to a still further aspect of the present invention, there is provided a method of supporting communications of a reader/writer with at least one of information carriers whose communication characteristics are different from one another. The method comprises storing a plurality of parameter files each including a plurality of control parameters required to the communications. The parameter files meet communication characteristics, respectively. The method comprises entering information including an identifier of one of the information carriers and a status of the one of the information carriers to be used; and retrieving one of the parameter files based on the entered information.

According to a still further aspect of the present invention, there is provided a method of supporting communications of a reader/writer with noncontact information carriers. The method comprises storing a relationship between communication conditions and a plurality of control parameters required to the communications. The communication conditions include communication standards adopted by the noncontact information carriers; manufacturers by which the noncontact information carriers are manufactured; uses of the noncontact information carriers; and communication distance ranges between the noncontact information carriers and the reader/writer; entering one of the communication conditions. The method comprises retrieving at least one of the control parameters that corresponds to the one of the communication conditions based on the relationship between the communication conditions and the plurality of control parameters.

According to a still further aspect of the present invention, there is provided a reader/writer supporting system for supporting communications of a reader/writer with at least one of information carriers whose communication characteristics are different from one another. The supporting system comprises a terminal apparatus configured to transmit, through a communication network, information including an identifier of one of the information carriers and a status of the one of the information carriers to be used. The supporting system comprises a supporting apparatus. The supporting apparatus comprises a database configured to store a plurality of parameter files each including a plurality of control parameters required to the communications. The parameter files meet communication characteristics, respectively. A retrieving unit is configured to retrieve one of the parameter files based on the transmitted information from the terminal apparatus to transmit the retrieved parameter file to the terminal apparatus through the communication network.

According to a still further aspect of the present invention, there is provided a reader/writer supporting system for supporting communications of a reader/writer with noncontact information carriers. The supporting system comprises a supporting apparatus. The supporting apparatus comprises a supporting apparatus comprising: a database configured to store a relationship between communication conditions and a plurality of control parameters required to the communications. The communication conditions includes communication standards adopted by the noncontact information carriers; manufacturers by which the noncontact information carriers are manufactured; uses of the noncontact information carriers. A communication distance ranges between the noncontact information carriers and the reader/writer. A terminal apparatus is configured to transmit one of the communication conditions through a communication network. The supporting apparatus further comprises a retrieving unit. The relating unit is configured to retrieve at least one of the control parameters that corresponds to the one of the communication conditions transmitted from the terminal apparatus based on the relationship between the communication conditions and the plurality of control parameters. The retrieving unit transmits the at least one of the retrieved control parameters to the terminal apparatus through the communication network.

BRIEF DESCRIPTION OF THE DRAWINGS

Other objects and aspects of the invention will become apparent from the following description of embodiments with reference to the accompanying drawings in which:

FIG. 2 is a view schematically illustrating an example of a file format of each control parameter file;

FIG. 6A is a view schematically illustrating a service menu screen displayed in the personal computer;

FIG. 6B is a view schematically illustrating a list displayed in the personal computer;

FIG. 6C is a view schematically illustrating a confirmation screen displayed in the personal computer;

FIG. 6D is a view schematically illustrating a file-creation request screen displayed in the personal computer.

DETAILED DESCRIPTION OF EMBODIMENTS OF THE INVENTION

Embodiments of the present invention will be described hereinafter with reference to the accompanying drawings.

First Embodiment

Figure 1:
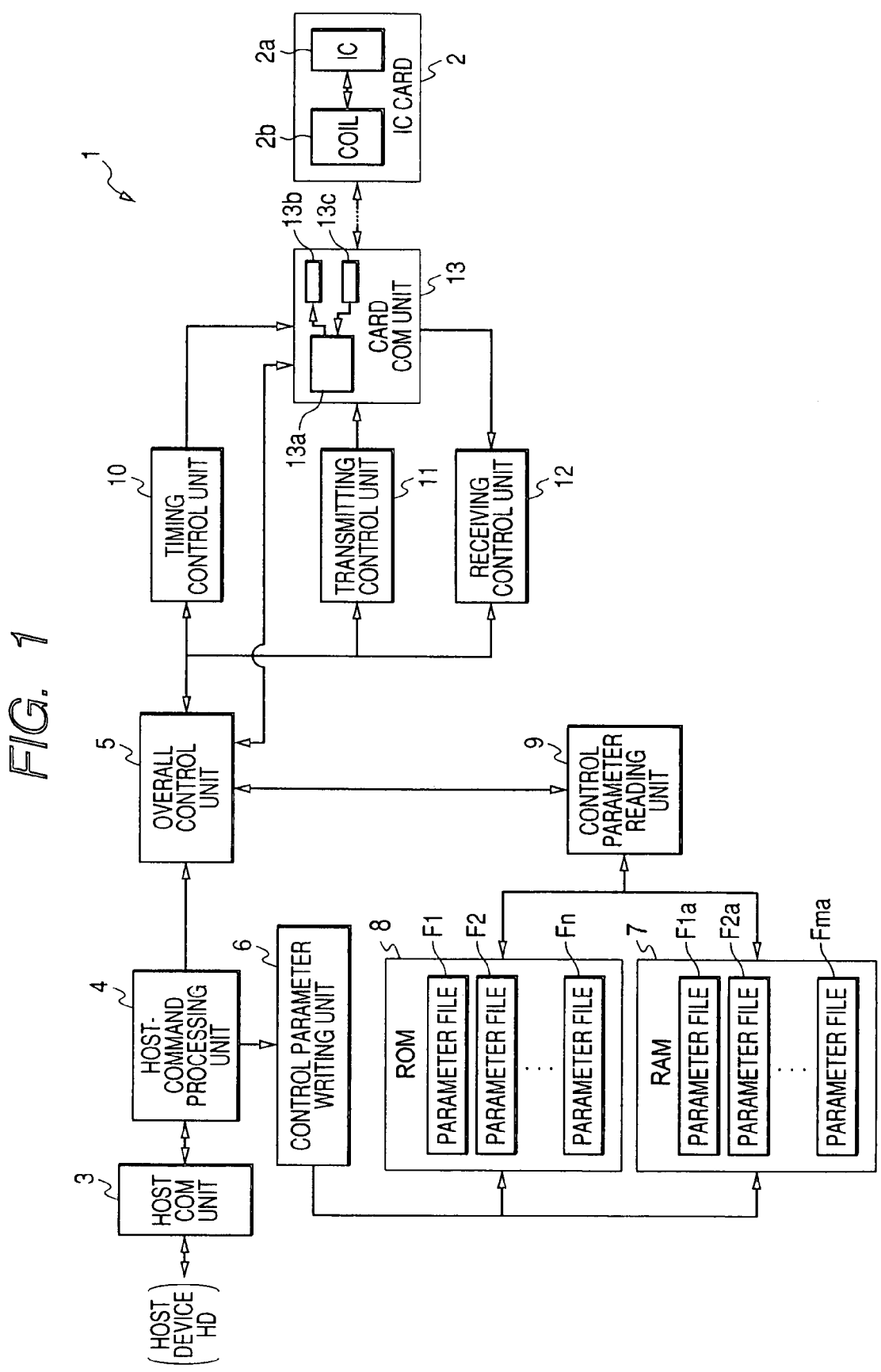
FIG. 1 is a block diagram illustrating a reader/writer according to a first embodiment of the present invention.

FIG. 1 is a functional block diagram schematically illustrating a configuration of a reader/writer 1 according to a first embodiment of present invention.

As illustrated in FIG. 1, the reader/writer 1 is operative to read and write data to a noncontact IC card 2 as an example of noncontact information carriers. The noncontact IC card is referred to as "card" hereinafter.

Specifically, the reader/writer 1 is provided with a host communication unit, a host-command processing unit 4, an overall control unit 5, a control-parameter writing unit 6, a RAM (Random Access Memory) 7, a ROM (Read Only Memory), such as EEPROM (Electrically Erasable Programmable ROM), 8, and a control-parameter reading unit 9. In addition, the reader/writer 1 is provided with a timing control unit 10, a transmitting control unit 11, a receiving control unit 12, and a card communication unit 13. In FIG. 1, the term "communication" is abbreviated to "com".

The host communication unit 3 is communicably connected to a host device HD of the reader/writer 1, such as a personal computer. The host device HD is operative to provide, to the reader/writer 1, commands including a start command, information to be written in the card 2, and data to specify one of control parameter files, described hereinafter, for communications of the reader/writer 1.

The host-command processing unit 4 is communicably connected to the overall control unit 5 and the control-parameter writing unit 6 and is operative to read the commands sent from the host device HD to execute operations based on the read commands. The overall control unit 5 is communicably connected to each of the control-parameter reading unit 9, the timing control unit 10, the send unit 11, and the receive unit 12. The overall control unit 5 is operative to execute overall control of the reader/writer 1.

Each of the RAM 7 and the ROM 8 is connected to the control-parameter writing unit 6 and the control-parameter reading unit 9 so that the writing and reading units 6 and 9 are accessible to the RAM 7 and ROM 8, respectively. In addition, each of the RAM 7 and the ROM 8 is configured to store control parameters for communications of the reader/writer 1 in file format.

Specifically, in the ROM 8, a plurality of control parameter files F1 to Fn are stored. The control parameter file F1 includes control parameters that meet a communication characteristic C1 for noncontact IC cards. The communication characteristic C1 is based on a first standard communication specification established on any one of predetermined communication standards for noncontact IC cards.

Similarly, each of the second to the n-th control parameter files F1 to Fn includes control parameters that meet each of communication characteristics C2 to Cn for noncontact IC cards. Each of the communication characteristics C2 to Cn is based on each of second to n-th standard communication specifications established on any one of the predetermined communication standards so that the communication characteristics C1 to Cn are different from each other.

In addition, in the RAM 7, the control parameter files F1a to Fma are stored. The control parameter file F1a includes control parameters that meet a communication characteristic C1a for noncontact IC cards. The communication characteristic C1a is based on any one of the first to n-th standard communication specifications and is determined by any one of the predetermined manufacturers.

Similarly, each of the second to the n-th control parameter files F2a to Fma includes control parameters that meet each of communication characteristics C2a to Cma for noncontact IC cards. Each of the communication characteristics C2a to Cma is based on any one of the first to n-th standard communication specifications and is determined by any one of the predetermined manufacturers so that the communication characteristics C1a to Cma are different from one another.

The control-parameter writing unit 6 is operative to write new control parameters provided from the host device HD in at least one of the RAM 7 and the ROM 8, and to update a control parameter stored in at least one thereof. In addition, the control-parameter writing unit 6 is operative to delete a control parameter stored in at least one of the RAM 7 and the ROM 8. The writing, updating, and deleting operations of the control-parameter writing unit 6 are executed under the control of the overall control unit 5.

The control-parameter reading unit 9 is operative to readout at least one control parameter from those stored in at least one of the RAM 7 and the ROM 8 to send the at least one readout control parameter to the overall control unit 5. The readout operation and the sending operation are executed under the control of the overall control unit 5. The overall control unit 5 is operative to receive the at least one readout control parameter to send it to each of the tiring control unit 10, the transmitting control unit 11, and the receiving control unit 12.

The card communication unit 13 is configured to directly access the card 2. Specifically, the card communication unit 13 is provided with a controller 13a, a transmitting antenna coil 13b electrically connected to the controller 13a, and a receiving antenna coil 13c electrically connected to the controller 13a. The controller 13a is operative to transmit high-frequency carrier signal (carrier radio signal) for electric power supply from the transmitting antenna coil 13b to the card 2 at given transmission timing. In addition, the controller 13a modulates the carrier signal at given modulation timing in accordance with data to transmit the modulated carrier signal with the data.

The transmitting control unit 11 is operative to control the output of the carrier signal and to control the controller 13a to modulate the carrier signal based on the data containing a command and/or writing information. The transmitting control unit 11 is also operative to control the amplitude of the modulated carrier signal.

The timing control unit 10 is operative to control, through the controller 13a, transmission timing of the carrier signal from the card communication unit 13. In addition, the timing control unit 10 is operative to control, through the transmitting control unit 11, timing at which the data is superimposed on the carrier signal.

The card 2 is provided with an IC (integrated circuit) 2a and a transmitting/receiving antenna coil 2b electrically connected to the IC 2a. The IC 2a includes a rectifying circuit, a detection circuit, a modem, a control unit, and a memory. Specifically, the carrier signal transmitted from the reader/writer 1 is received by the transmitting/receiving antenna coil 2b so that the coil 2b generates AC power therethrough by electromagnetic induction, The AC power is rectified by the rectifying circuit to generate DC power for operating the IC 2a. The data superimposed on the carrier signal is detected by the detection circuit, and the data is demodulated by the modem, so that the control unit analyzes the demodulated data to execute operations based on the analyzed result.

When a command is superimposed on the received carrier signal, the controller causes the modem to modulate a response signal with data corresponding to the command. The controller transmits the response signal with the data from the transmitting/receiving antenna coil 2b to the reader/writer 1.

The receiving antenna coil 13c receives the response signal transmitted from the card 2, so that the received response signal is sent to the receiving control unit 12. The receiving processing circuit 12 demodulates the data from the response signal to analyze the demodulated data.

As set forth above, in general, noncontact IC cards including the card 2 have different communication characteristics from one another for each card. For example, the communication standards for noncontact IC cards include ISO/IEC14443 type with different specifications of type A and type B. Communication characteristics have been differently determined for the ISO/IEC14443 type A and type B standards, respectively.

Noncontact IC cards with the same standard and specifications have different communication characteristics in cases where the manufacturers thereof are different from one another. In addition, even if noncontact IC cards with the same standard and specifications are manufactured by the same manufacturer, when at least one of the noncontact IC cards is upgraded, the communication characteristic of the upgraded IC card is different from those of the remaining noncontact IC cards.

That is, the communication characteristics of noncontact IC cards including the card 2 are generally different from one another depending on their communication specifications, their manufacturers, and/or their circumstances under which they are used.

Different communication characteristics of noncontact IC cards require that control parameters to be provided to the timing control unit 10, the transmitting control unit 11, and the receiving control unit 12 meet any different communication characteristics of noncontact IC cards that communication target carriers of the reader/writer 1.

Thus, in the first embodiment of the present invention, a group of control parameters, which meets each of the different communication characteristics of noncontact IC cards, is stored in each of the control parameter files F1 to Fn and F1a to Fma of the ROM 8 and the RAM 7.

An example of the file format of each control parameter file is schematically illustrated in FIG. 2.

As illustrated in FIG. 2, each control parameter file is composed of a parameter-file identification code field L1, a parameter-file specification code field L2, and a file-order identification code field L3. Each parameter file is also composed of a carrier-control parameter description field L4, a transmitting-control parameter description field L5, and a receiving-control parameter description field L6.

In the parameter-file identification code block B1, a parameter-file identification code for identifying this control parameter file is described, and a parameter-file specification code indicative of a communication specification (type) and a communication standard that his control parameter file meets is described in the parameter-file specification code block B2. In the file-order identification code block B3, a file-order identification code representing the order in which this control parameter file is stored in the ROM 8 or the RAM 7 is described.

In the carrier-control parameter description block CB, data indicative of the number "N" of control parameters effectively described in this block CB is described. In addition, in the first embodiment, the control parameters described in the carrier-control parameter description block CB consist of parameters CS, OR, RC, and RT.

Figure 3A:
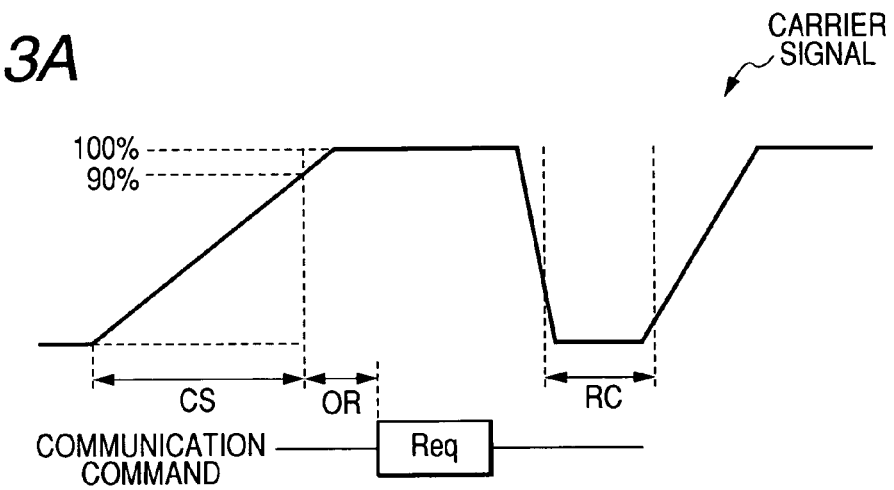
FIG. 3A represents a carrier sweep from which a carrier signal is in OFF to which the carrier signal reaches 90% of a maximum output level.

The control parameter CS, as shown in FIG. 3A, represents a carrier sweep from which the carrier signal is in OFF to which the carrier signal reaches 90% of the maximum output level (100%). The time interval can be represented as an angular rate.

The control parameter OR represents, as shown in FIG. 3A, a request waiting time interval from the carrier signal reaches 90% of the maximum output level (100%) thereof to a timing at which the data signal, such as a communication command (for example, request command Req), is superimposed on the carrier signal.

The control parameter RC represents, as shown in FIG. 3A, a carrier-off time interval during which the carrier signal is lower than a predetermined level when it is cycled ON/OFF.

The control parameter RT represents the maximum number of retries for each communication, for example, for each transmission of a command.

In the transmitting-control parameter description block TB, data indicative of the number "N" of control parameters effectively described in this block TB is described. In addition, in the first embodiment, the control parameters described in the transmitting-control parameter description block TB consist of parameters MP, CP, and MV.

Figure 3B:
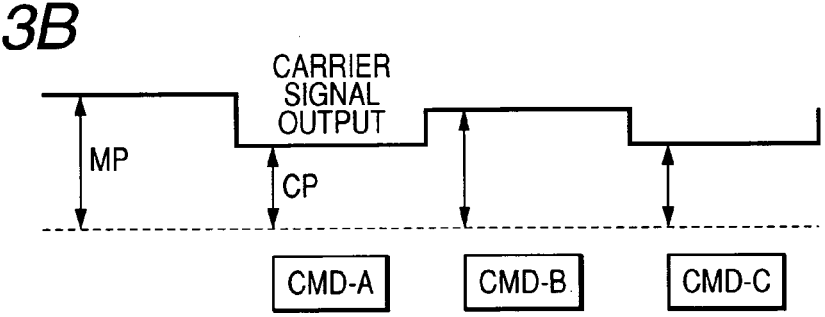
FIG. 3B represents a control parameter that represents a maximum output level, such as the maximum power, of the carrier signal.

The control parameter MP, as shown in FIG. 3B, represents the maximum output level, such as the maximum power, of the carrier signal.

The control parameter CP represents, as shown in FIG. 3B, power required for each, of some control commands. In the first embodiment, the control parameter CP includes the number "N" of control commands (CMD-A, CMD-B, and CMD-C) each required to control its power. The control parameter CP also includes a power control value of each of the control commands CMD-A, CMD-B, and CMD-C; this power control value is represented as a percent with respect to the maximum power. Specifically, in the first embodiment, the commands A (CMD-A), B (CMD-B), and C (CMD-C) are 60%, 80%, and 65% to the maximum power, respectively.

The control parameter MV represents an optimum value of a modulation index. In the first embodiment, when the carrier signal is modulated using ASK (Amplitude Shift Keying), the modulation index is the ratio of the amplitude corresponding to logical "1" to the amplitude corresponding to logical "0" in the modulated carrier signal.

In the receiving-control parameter description block RB, data indicative of the number "N" of control parameters effectively described in this block RB is described. In addition, in the first embodiment, the control parameters described in the receiving-control parameter description block RB consist of parameters NT, NP, and MR.

Figure 3C:
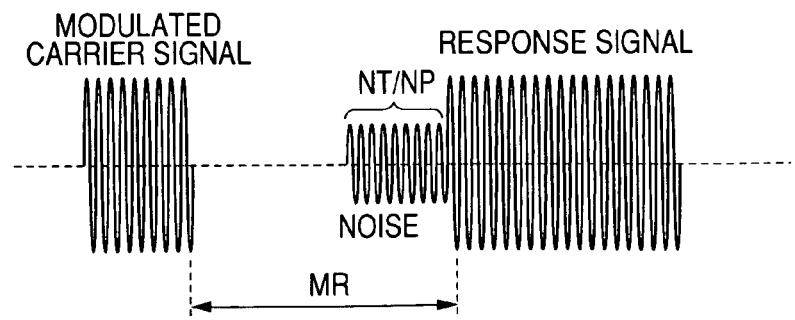
FIG. 3C represents a plurality of first noise patterns that occur with a response signal.

The control parameter NT, as shown in FIG. 3C, represents a plurality of first noise patterns that occur with a response signal; these noise patterns include random noise pattern and a fundamental frequency noise pattern.

The control parameter NP, as shown in FIG. 3C, represents a plurality of second noise patterns for reducing the first noise patterns.

The control parameter MR represents a minimum time interval from the end of transmission of a command to receiving of a response signal corresponding to the transmitted command. The control parameter MR allows the reader/writer 1 to handle a response signal that is received thereby within the minimum time interval as a noise.

When the reader/writer 1 as configured above starts to communicate with the card 2, firstly reads out one of the control parameter files F1 to Fn and F1a to Fma stored in any one of the ROM 8 and RAM 7. Subsequently, the reader/writer 1 tries to transmit and receive data to the card 2 in a control mode defined by the control parameters included in the firstly readout control parameter file.

When transmitting and receiving of data between the reader/writer 1 and the card 2 have been tried unsuccessfully in the control mode based on the first readout control parameters, the reader/writer 1 secondary reads out another one of the control parameter files F1 to Fn and F1a to Fma. Subsequently, the reader/writer 1 tries to transmit and receive data to the card 2 in a control mode defined by the control parameters included in the secondary readout control parameter file.

Specifically, in the first embodiment, the reader/writer 1 sequentially reads out the control parameter files F1 to Fn and F1a to Fma stored in any one of the ROM 8 and RAM 7 to retrieve which control parameter file allows the reader/writer 1 to transmit and receive data successfully to the card 2.

As a result, the reader/writer 1 can transmit and receive data to the card 2 in a control mode defined by the control parameters included in the retrieved control parameter file.

In addition, in the first embodiment, it is possible for the reader/writer 1 to specify a command to identify at least one of the control parameters, which corresponds to the specified command, thereby transmitting and receiving data based on the at least one of the identified control parameters.

Operations of the reader/writer 1 to retrieve one of the control parameter files will be described hereinafter with reference to FIG. 4.

In order to start to communicate between the reader/writer 1 and the card 2, a user turns on power switches (not shown) of the host device HD and the reader/writer 1, respectively. The turning-on of the power switch makes the host device HD start operating, so that the host device HD transmits the start command to the reader/writer 1.

After one of the control parameter files, which meets the communication characteristic of the card 2, has been retrieved, it is only necessary for the reader/writer 1 to communicate with the card 2 based on the control parameters included in the retrieved control parameter file. The host device HV therefore can transmit, in addition to the start command, data indicative of the retrieved control parameter file that meets the communication characteristic of the card 2; this data is, for example, the parameter-file identification code of the retrieved control parameter file.

However, when the reader/writer 1 tries to communicate with the card 2 first, which control parameter file meets the communication characteristic of the card 2 is not identified. The card 2 may be one of standard cards that meet the communication specifications based on the communication standards predetermined for noncontact IC cards, respectively. By this reason, when the reader/writer 1 starts to communicate with the card 2 first, the host device HV is configured to transmit the start command to the reader/writer 1 first without attaching data to specify one of the control parameter files.

Figure 4:
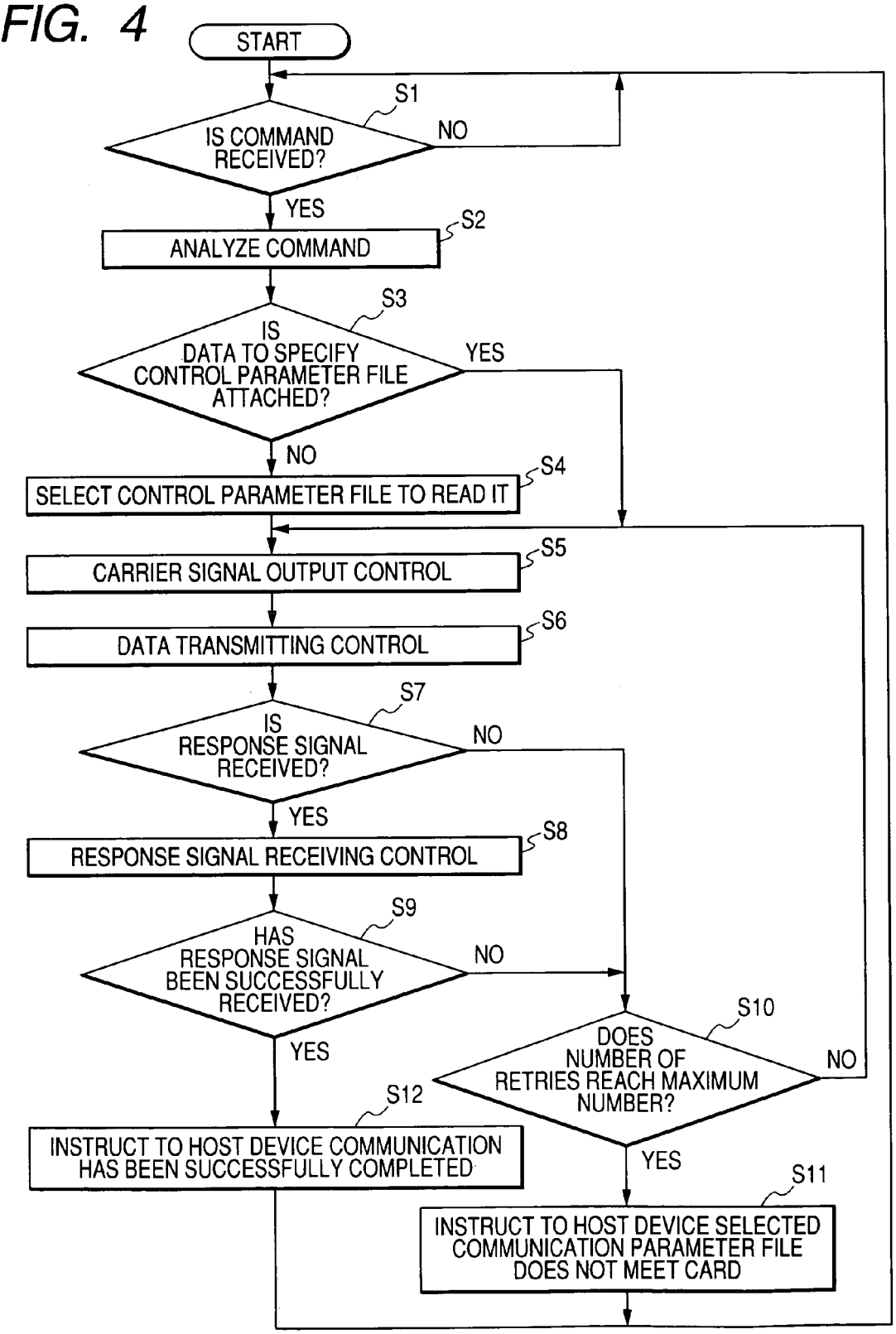
FIG. 4 is a flowchart for retrieving a parameter file that meets the communication characteristic of a card.

After the turning on of the power switch of the reader/writer 1, the host-command processing unit 4 of the reader/writer 1 has determined whether the start command is transmitted from the host device HV (FIG. 4; step S1).

When the start command is transmitted from the host-device HV, the determination in step S1 is YES, so that the host-command processing unit 4 analyzes the command transmitted from the host-device HV (step S2) to determine whether data to specify one of the control parameter files is attached to the start command.

When no data to specify one of the control parameter files is attached to the start command, the determination in step S3 is NO, so the host-command processing unit 4 sends the start containing with no parameter-file specifying data to the overall control unit 5 (step S3).

The overall control unit 5 accesses the ROM 8 through the control-parameter reading unit 9 to select the control parameter file F1, and to read out the control parameters included in the selected control parameter file F1 (step S4). Subsequently, the overall control unit 5 provides the readout control parameters to each of the timing control unit 10, the transmitting control unit 11, and the receiving control unit 12.

Each of the timing control unit 10, the transmitting control unit 11, the receiving control unit 12, and the card control unit 13 executes predetermined processes based on the provided control parameters.

For example, the timing control unit 10 controls, through the card communication unit 13, the transmission timing of the carrier signal from the card communication unit 13 based on the control parameter RC. In addition, the timing control unit 10 and the transmitting control unit 11 control, for example, the timing at which the data is superimposed on the carrier signal based on the control parameters CS and OR in step S5.

Furthermore, for example, the receiving control unit 12 controls the output of the carrier signal based on the control parameters MP and CP. Furthermore, for example, the transmitting control unit 11 controls the amplitude of the modulated carrier signal based on the control parameter MV in step S6.

The control operations of the timing control unit 10 and the transmitting control unit 11 cause the card communication unit 13 to try to transmit, through the transmitting antenna coil 13b, the carrier signal to the card 2. In addition, the card communication unit 13 modulates the carrier signal to superimpose the data including, for example, the request command Req thereon at the timing provided by the timing control unit 10, thereby trying to transmit the carrier signal on which the data is superimposed to the card 2.

After trying to transmit the modulated carrier signal with the data, the card communication unit 13 has determined whether a response signal is transmitted from the card 2 in step S7.

When it is determined that no response signal is transmitted from the card 2, the determination in step S7 is NO, the overall control unit 5 shifts to step S10.

In contrast, when it is determined that the response signal is transmitted from the card 2 (the determination in step S7 is YES), the card communication unit 13 receives the response signal to send it to the receiving control unit 12. The receiving control unit 12 receives the sent response signal to demodulate data superimposed on the response signal based on, for example, the control parameters NT, NP, and RC in step S8, and determines whether the response signal has been successfully received in step S9.

For example, when it is determined that the response signal has not been successfully received, the determination in step S9 is NO, the overall control unit 5 shifts to step S10. For example, in step S9, a predetermined period of time has elapsed after the transmission of the carrier signal, which causes the overall control unit 5 to determine that the response signal has not been successfully received. Moreover, the overall control unit 5 checks the demodulated data to determine whether the demodulated data corresponds to the request command Req, and when the demodulated data does not correspond to the request command Req, the overall control unit 5 determines that the response signal has not been successfully received.

In step S10, the overall control unit 5 determines whether the number of retries of transmitting the carrier signal with the data reaches the maximum number of retries specified by the control parameter RT.

When it is determined that the number of retries of transmitting the carrier signal with the data does not reach the maximum number of retries specified by the control parameter RT, the determination in step S0 is NO, so that the overall control unit 5 returns to step S5.

Subsequently, the overall control unit 5, the timing control unit 10, the transmitting control unit 11, the receiving control unit 12, and the card communication unit 13 repeatedly retry the above carrier signal and data transmitting operation and the response signal receiving operation (steps S5 to S10).

When it is determined that the number of retries (retry operations) of transmitting the carrier signal with the data reaches the maximum number of retries specified by the control parameter RT (the determination in step S10 is YES), the overall control unit 5 shifts to step S11. In step S11, the overall control unit 5 determines that the selected control parameter file F1 does not meet the communication characteristic of the card 2. Thus, the overall control unit 5 instructs the determined result to the host device HD through the host command processing unit 4 (step S11), returning to the operation in step S1.

When receiving the determined result representing that the selected control parameter file F1 does not meet the communication characteristic of the card 2, the host device HV transmits the start command to the reader/writer 1 first with data to specify the next control parameter file F2 attached.

As a result, because the determination in step S1 is YES, the host-command processing unit 4 analyzes the command transmitted from the host-device HV (see step S2), and determines that data to specify the control parameter file F2 is attached to the start command (see the determination in step S3 is YES).

Hence, the overall control unit 5 accesses the ROM 8 through the control-parameter reading unit 9 to select the control parameter file F2, and to read out the control parameters included in the selected control parameter file F2 (see step S4). Subsequently, the overall control unit 5 provides the readout control parameters to each of the timing control unit 10, the transmitting control unit 11, and the receiving control unit 12.

As set forth above, the overall control unit 5, the control units 10 to 12, and the card communication unit 13 repeatedly retry the above carrier signal and data transmitting operation and the response signal receiving operation based on the provided control parameters (steps S5 to S10) when the determination in step S7 or step S9 is NO.

When it is determined that the number of the retries (retry operations) reaches the maximum number of retries specified by the control parameter RT (see the determination in step S10 is YES), the overall control unit 5 determines that the selected control parameter file F2 does not meet the communication characteristic of the card 2.

Thus, the overall control unit 5 instructs the determined result to the host device HD (see step S11), returning to the operation in step S1. This allows the host device HV to specify the next control parameter file F3 (see steps S1 to S3), so that the communications between the reader/writer 1 and the card are executed based on the control parameters included in the specified control parameter file F3 (see steps S5 to S10).

Thus, even though the communications between the reader/writer 1 and the card 2 are executed based on all of the control parameters included in all of the specified control parameter files F1 to Fn in the ROM 8, no communications between the reader/writer 1 and the card 2 may be successfully completed.

In this case, the host device HV specifies the parameter file F1a stored in the RAM 7 in step S1, so that the communications between the reader/writer 1 and the card 2 are executed based on the control parameters included in the specified control parameter file F1a (see steps S5 to S10).

Specifically, as in the case with the control parameter files F1 to Fn, the control parameter files F1a to Fma in the RAM 7 are sequentially selected, so that the communications between the reader/writer 1 and the card 2 are executed based on the control parameters included in the sequentially selected control parameter files F1a to Fma, respectively.

In contrast, when the response signal has been successfully received based on the control parameters included in any one of the control parameter files F1 to Fn and F1a to Fma in step S9, the determination in step S9 is YES. Thus, the overall control unit 5 identifies that any one of the control parameter files F1 to Fn and F1a to Fma meets the communication characteristic of the card 2. Subsequently, the overall control unit 5 instructs, to the host device HD through the host command processing unit 4, that the communications between the reader/writer 1 and the card 2 have been successfully completed (step S12). In addition, in step S12, the overall control unit 5 instructs, to the host device HD through the host command processing unit 4, that data indicative of the identified control parameter file that meets the communication characteristic of the card 2; this data is, for example, the parameter-file identification code of the identified control parameter file. After the operation, the overall control unit 5 returns to the operation in step S1.

As a result, when transmitting a next command, the host device HD transmits a command to which the parameter-file identification code indicative of the identified file is attached to the reader/writer 1. This allows the overall control unit 5 to retrieve one of the control parameter files from the ROM 8 or the RAM 7 on the parameter-file identification code, thereby reading out the retrieved control parameter file. The overall control unit 5, the control units 10 to 12, and the card communication unit 13 therefore successfully communicate with the card 2 based on the control parameters included in the retrieved control parameter file.

As described above, in the first embodiment of the present invention, the RAM 7 and the ROM 8 store the control parameter files that meet the communication characteristics of noncontact IC cards; these communication characteristics are different from one another. When communicating with any one of the noncontact IC cards, this configuration allows the reader/writer 1 to try to communicate with any one of the noncontact IC cards while sequentially selecting the control parameter files. This makes it possible to automatically identify any one of the communication parameter files that meets the communication characteristic of any one of the noncontact IC cards. When communicating between the reader/writer 1 and any one of the noncontact IC cards, use of the identified control parameter files permits the reader/writer 1 to successfully communicate with any one of the noncontact IC cards.

Second Embodiment

Figure 5:
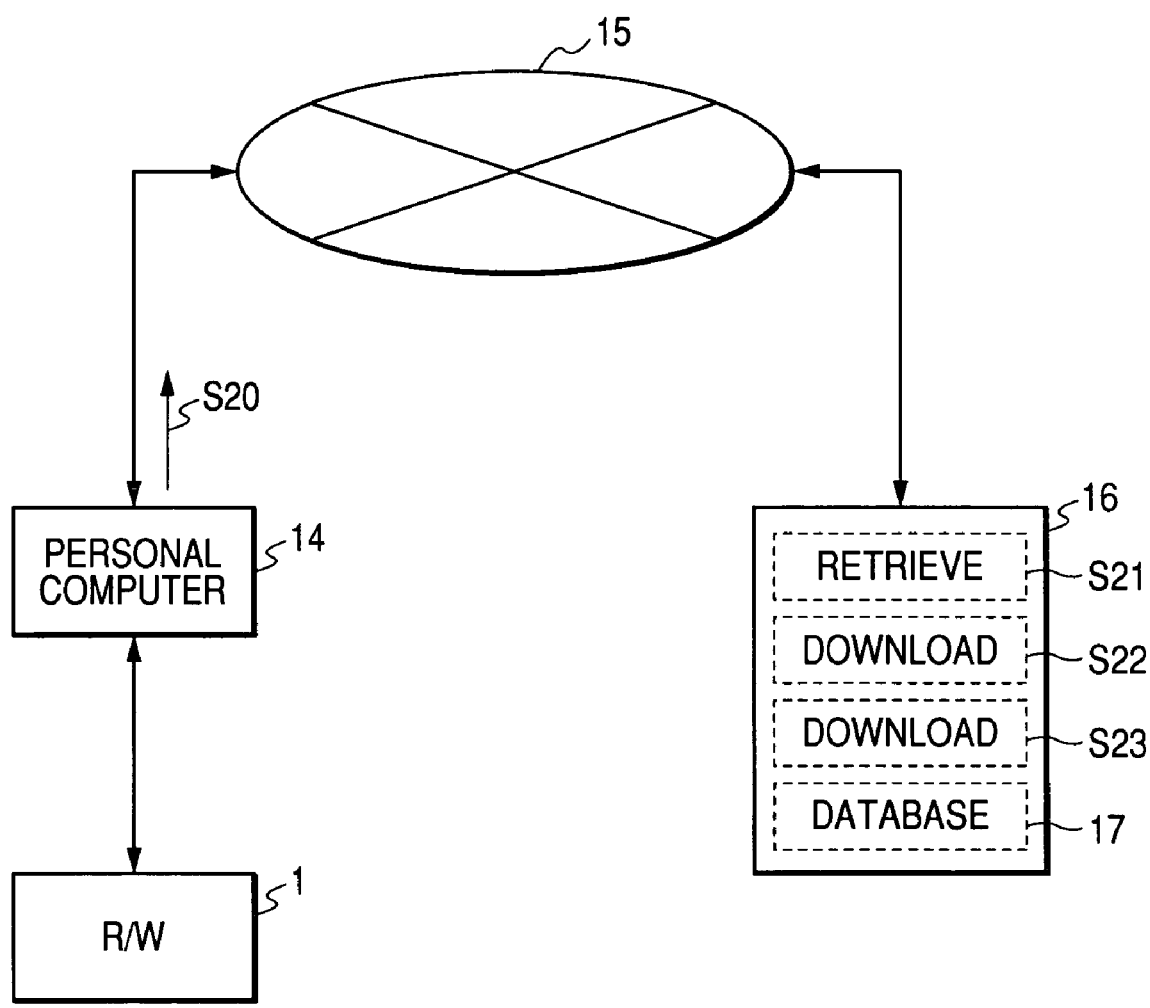
FIG. 5 is a block diagram illustrating a reader/writer according to a first embodiment of the present invention.

FIGS. 5 and 6 show a second embodiment of the present invention. Different points of the second embodiment from the first embodiment are that, when the reader/writer 1 includes a new noncontact IC card in communication target carriers, the second embodiment allows the reader/writer 1 to get communication parameters which meet the communication characteristic of the new noncontact IC card from a support center.

Schematically, as illustrated in FIG. 5, the reader/writer 1 is communicably connected to a personal computer 14 as a host device thereof. The personal computer 14 serves as a terminal apparatus and allows establishment of electrical connection with a support server 16 in the support center through a communications network 15. The support server (server computer) 16 has a database 17 in which control parameter files F1b to Fnb are stored. The control parameter files F1b to Fnb, which are substantially identical with those in the first embodiment, are categorized by:

Communication standards adopted by noncontact IC cards that the control parameter files F1b to Fnb meet;

manufacturers by which the noncontact IC cards are manufactured;

brand names corresponding to the noncontact IC cards;

uses for the noncontact IC cards; and operations (insert, touch, touch and go or the like) of the noncontact IC cards.

In other words, the operations of the noncontact IC cards represent the statuses thereof to be used. For example, the operation "insert" represents that a user inserts his/her noncontact IC card thereof into a reader/writer to communicate between the noncontact IC card and the reader/writer. The operation "touch" represents that a user touches his/her noncontact IC card to a reader/writer to communicate between the noncontact IC card and the reader/writer. The operation "touch and go" represents that a user touches his/her noncontact IC card to a predetermined position of a housing of a reader/writer while going to communicate between the noncontact IC card and the reader/writer.

In addition, communication distance ranges between noncontact IC cards and the reader/writer 1 are stored in the database 17 to be associated with the control parameter files F1b to Fnb.

When a new noncontact IC card is added to the communication target carriers of the reader/writer 1, a user enters commands into the personal computer 14 so that it establishes electrical connection with the support server 16 through the communications network 15. The support server 16 generates a support-service menu screen MS part of which is clickable to provide it to the personal computer 14 through the communications network 15. The support-service menu screen MS is displayed on a display of the personal computer 14. On the support-service menu screen MS, three clickable areas indicative of service menu that the support server 16 can provide, such as "database list", "new file creation request", and "search service", which constitute clickable areas CL1, CL2, and CL3, respectively.

A user operates an input device (pointing device) of the personal computer 14 to click the clickable area C1 of "database list". The personal computer 14 transmits the command corresponding to the clickable area C1 to the support server 16, to that the support server 16 generates a list LI on which the card standards, the brand names, the uses, and the manufacturers are arranged for each card. The support serer 16 causes the personal computer 14 to display the list LI on the display of the personal computer 14 (see FIG. 6B).

As shown in FIG. 6B, in the list LI, "wish" checkboxes are provided for each card, and "three-operation checkboxes" are provided for each card.

The user operates the input device of the personal computer 14 to check at least one of the "wish" checkboxes, which corresponds to at least one card as the new communication target carrier. In addition, the user operates the input device of the personal computer 14 to check any one of the "three-operation checkboxes" corresponding to the checked "wish" checkbox, and to click the "OK" button. The personal computer 14 transmits data indicative of the specified card and the selected operation to the support server 16.

The support server 16 retrieves any one of the control parameter files F1b to Fnb, which corresponds to the specified card and selected operation (FIG. 5; step S21). Next, the support server 16 causes the personal computer 14 to display a confirmation screen CS indicative of the retrieved control parameter file on the display of the personal computer 14 (see FIG. 6C).

When the user operates the input device to click the "download" button on the confirmation screen CS, the personal computer 14 transmits the command corresponding to the click of download, so that the support server 16 receives the command to download the retrieved control parameter file to the personal computer 14 (step S22). The personal computer 14 receives the downloaded control parameter file to transmit the received control parameter file to the reader/writer 1. The control parameter writing unit 6 of the reader/writer 1 writes the control parameter file in the RAM 7.

In addition, on the service menu screen MS, the user operates the input device of the personal computer 14 to click the clickable area CL3 of "new file creation request". The personal computer 14 transmits the command corresponding to the clickable area CL3 to the support server 16, so that the support server 16 generates a file-creation request screen RS on which four kinds of communication conditions (card types, card manufacturers, uses of card, and required communication distances) are selectable (checkable). The support server 16 causes the personal computer 14 to display the file-creation request screen RS on the display of the personal computer 14 (see FIG. 6D).

As shown in FIG. 6D, in the screen RS, the user operates the input device of the personal computer 14 to check any one of the card types, any one of the card manufacturers, any one of the uses, and any one of the required communication distances.

In addition, the user operates the input device of the personal computer 14 to click the "OK" button. The personal computer 14 transmits data indicative of the communication conditions to the support server 16.

The support server 16 selects control parameters corresponding to the entered communication conditions to at least one control parameter file, or selects at least one of the parameter files that meets the communication conditions.

Subsequently, the support server 16 causes the personal computer 14 to display a confirmation screen CS1 indicative of the entered communication conditions on the display of the personal computer 14 (see FIG. 6C).

When the user operates the input device to click the "download" button on the confirmation screen CS1, the personal computer 14 transmits the command corresponding to the click of download, so that the support server 16 receives the command to download the generated or retrieved control parameter file to the personal computer 14 (step S23). The personal computer 14 receives the downloaded control parameter file to transmit the control parameter file to the reader/writer 1. The control parameter writing unit 6 of the reader/writer 1 writes the control parameter file in the RAM 7.

As described above, in the second embodiment, when adding a new card to the communication target carriers of the reader/writer 1, it is possible to obtain the control parameters that meet the communication characteristic of the new card from the support server 16. This can establish product requirements to the reader/writer 1; these product requirements allow the reader/writer 1 to successfully communicate with the new card.

Figure 7:
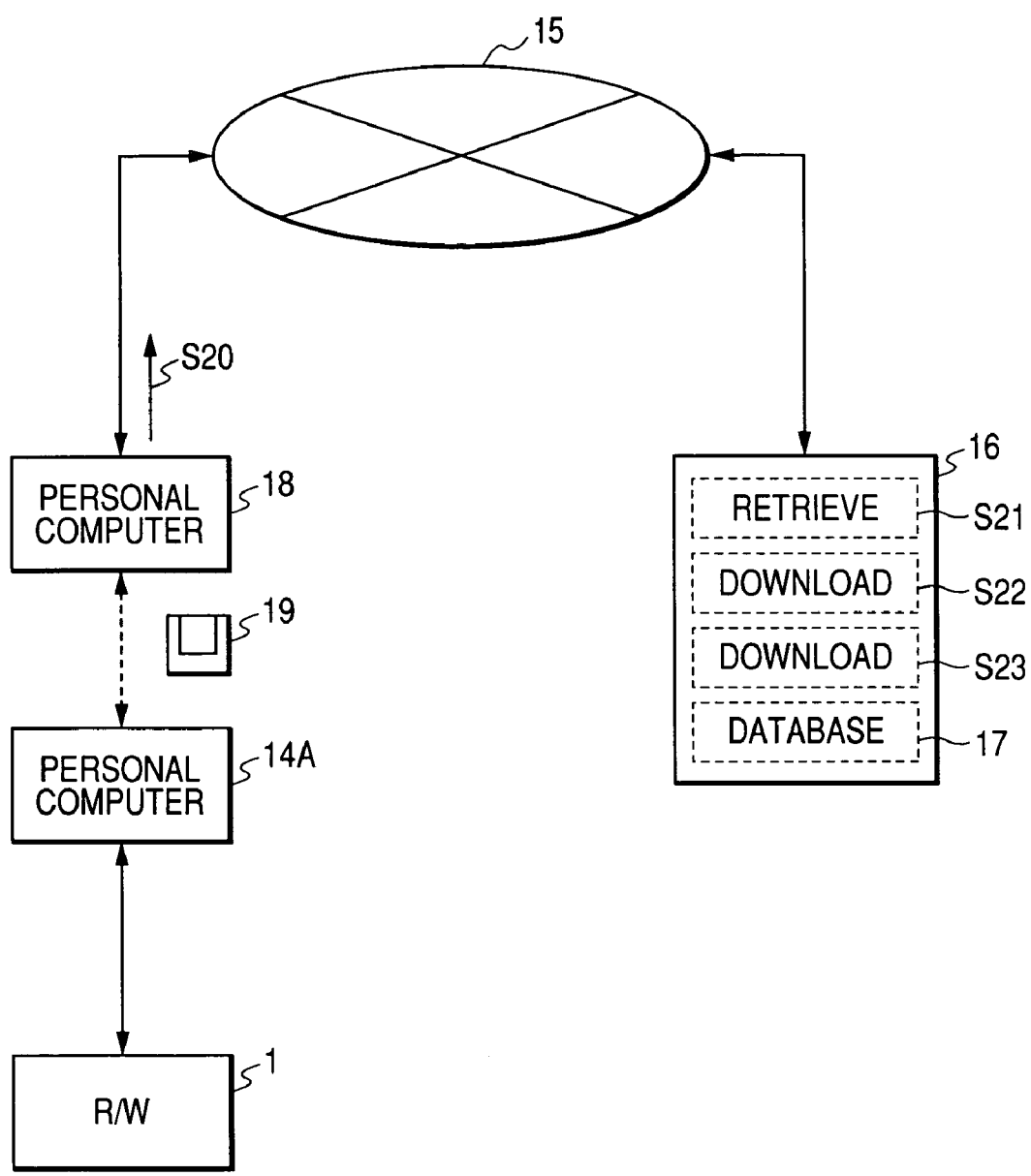
FIG. 7 is a block diagram illustrating a reader/writer according to a first embodiment of the present invention.

FIG. 7 is a modification of the second embodiment of the present invention. In the modification, a personal computer 18 serves as the personal computer 14 shown in FIG. 6 to access the support server 16. The control parameters obtained by the personal computer 18 from the support server 16 are downloaded through a media 19, such as floppy disk, to a personal computer 14A, which is a host device of the reader/writer 1. The downloaded control parameters are stored in the RAM 7 of the reader/writer 1.

Some of the control parameter files stored in each of the RAM 7 and ROM 8 can be deleted by the control parameter writing unit 6, and some of the control parameters included in the control parameter files can be deleted and/or updated by the control parameter writing unit 6.

When transmitting a specified command or data to the card, an external device, such as the host device can temporally transmit specified control parameters to the reader/writer 1. In this case, the overall control unit 5, the timing control unit 10, the transmitting control unit 11, and the receiving control unit 12 of the reader/writer 1 execute the transmitting and receiving of data based on the specified control parameters (see steps S5 to S10). This modification can transmit the carrier signal with a predetermined command based on the temporally transmitted control parameters without using the control parameters previously stored in the ROM 8 or the RAM 7.

The control parameter files F1 to Fn and F1a to Fma can be stored in either the RAM 7 or the ROM 8. A storage unit except for the RAM 7 and the ROM 8 can store the control parameter files F1 to Fn and F1a to Fma. IC tags or other memory devices can be used as noncontact information carriers. The requests of the control parameters and the parameter file can be transmitted via e-mails to the personal computer. The control parameters and the parameter file can be returned from the support server 16 to the personal computer via e-mails or media.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A reader/writer for communications with at least one of information carriers whose communication characteristics are different from one another, the reader/writer comprising:
   a plurality of first parameter files each including a plurality of control parameters required for the communications,
      the plurality of first parameters files respectively meeting the communication characteristics of the information carriers, the communication characteristics being respectively based on a plurality of standard communication specifications for the information carriers; and
   a plurality of second parameter files each including plurality of control parameters required for the communications,
      the plurality of second parameters files being based on one of the plurality of communication characteristics and respectively depending on at least one of: different manufacturers for the information carriers, and different circumstances under which the information carriers are used; and
   an identifying unit configured to try to communicate with the at least one of the information carriers using the plurality of first and second parameter files to identify which one of the first and second parameter files meets the communication characteristic of the at least one of the information carriers based on a result of the trying to communicate.

2. A reader/writer according to claim 1, further comprising a control parameter writing unit configured to:
   write a new control parameter corresponding to the at least one control parameter included in at least one of the first and second parameter files in the storage unit; and
   update the corresponding at least one control parameter to the new control parameter.

3. A reader/writer according to claim 1, further comprising a control unit configured to communicate with the at least one of the information carriers based on at least one control parameter, the at least one control parameter being temporarily provided from an external device.

4. A reader/writer according to claim 1, wherein the identifying unit is configured to:
   try to transmit a carrier signal on which data is superimposed based on selected one of the plurality of first and second parameter files;
   determine whether a response signal is transmitted from the at least one of the information carriers and whether a response signal transmitted from the at least one of the information carriers is successively received; and
   repeat the trying operation to the selected one of the plurality of first and second parameter files at least one of when it is determined that a response signal is not transmitted from the at least one of the information carriers and when a response signal transmitted from the at least one of the information carriers is not successively received.

5. A reader/writer according to claim 4, wherein the control parameters of each of the plurality of first and second parameter files include a parameter representing a maximum number of repeat of the trying operations, and the identifying unit is configured to:
   determine whether a number of repeat of the trying operations reaches the maximum number; and
   repeat the trying operation while shifting selection of one of the parameter files when it is determined that the number of repeat of the trying operations reaches the maximum number.

6. A supporting apparatus for supporting communications of a reader/writer with at least one of information carriers whose communication characteristics are different from one another, the supporting apparatus comprising:
   a database;
   a plurality of first parameter files stored in the database, each of the plurality of first parameter files including a plurality of control parameters required for the communications,
      the plurality of first parameter files respectively meeting the communication characteristics of the information carriers, the communication characteristics being respectively based on a plurality of standard communication specifications for the information carriers;
   a plurality of second parameter files stored in the database, each of the plurality of second parameter files including a plurality of control parameters required for the communications,
      the plurality of second parameter files being based on one of the plurality of communication characteristics and respectively depending on at least one of: different manufacturers for the information carriers, and different circumstances under which the information carriers are used; and
   a retrieving unit configured to, when information including an identifier of one of the information carriers and a status of the one of the information carriers to be used is entered, retrieve one of the plurality of parameter files based on the entered information.

7. A supporting apparatus for supporting communications of a reader/writer with noncontact information carriers, the supporting apparatus comprising:
   a plurality of first parameter files each including a plurality of control parameters required for the communications,
      the plurality of first parameter files respectively meeting the communication characteristics of the information carriers, the communication characteristics being respectively based on a plurality of standard communication specifications for the information carriers;

a plurality of second parameter files each including a plurality of control parameters required for the communications, the plurality of second parameter files being based on one of the plurality of communication characteristics and respectively depending on at least one of: different manufacturers for the information carriers, and different circumstances under which the information carriers are used;

a database configured to store a relationship between communication conditions and the plurality of first and second parameter files required for the communications, the communication conditions including:

communication standards adapted by the noncontact information carriers;

manufacturers by which the noncontact information carriers are manufactured;

statuses of use of the noncontact information carriers; and communication distance ranges between the noncontact information carriers and the reader/writer; and a retrieving unit configured to, when one of the communication conditions is entered, retrieve at least one of the plurality of first and second parameter files that corresponds to the one of the communication conditions based on the relationship between the communication conditions and the plurality of first and second parameter files.

8. A method of supporting communications of a reader/writer with at least one of information carriers whose communication characteristics are different from one another, the method comprising:

storing therein;

a plurality of first parameter flies each including a plurality of control parameters required for the communications, the plurality of first parameter flies respectively meeting the communication characteristics of the information carriers, the communication characteristics being respectively based on a plurality of standard communication specifications for the information carriers; and a plurality of second parameter files each including a plurality of control parameters required for the communications, the plurality of second parameter files being based on one of the plurality of communication characteristics and respectively depending on at least one of: different manufacturers for the information carriers, and different circumstances under which the information carriers are used;

entering information including an identifier of one of the information carriers and a status of the one of the information carriers to be used; and retrieving one of the plurality of first and second parameter files based on the entered information.

9. A method of supporting communications of a reader/writer with noncontact information carriers, the method comprising:

preparing:

a plurality of first parameter files each, including a plurality of control parameters required for the communications, the plurality of first parameter files respectively meeting the communication characteristics of the information carriers, the communication characteristics being respectively based on a plurality of standard communication specifications for the information carriers; and a plurality of second parameter files each including a plurality of control parameters required for the communications, the plurality of second parameter files being based on one of the plurality of communication characteristics and respectively depending on at least one of: different manufacturers for the information carriers, and different circumstances under which the information carriers are used;

storing a relationship between communication conditions and the plurality of first and second parameter files required for the communications, the communication conditions including:

communication standards adapted by the noncontact information carriers;

manufacturers by which the noncontact information carriers are manufactured;

uses of the noncontact information carriers; and communication distance ranges between the noncontact information carriers and the reader/writer;

entering one of the communication conditions; and retrieving at least one of the plurality of first and second parameter files that corresponds to the one of the communication conditions based on the relationship between the communication conditions and the plurality of first and second parameter files.

10. A reader/writer supporting system for supporting communications of a reader/writer with at least one of information carriers whose communication characteristics are different from one another, the supporting system comprising:

a terminal apparatus configured to transmit, through a communication network, information including an identifier of one of the information carriers and a status of the one of the information carriers to be used; and a supporting apparatus comprising:

a database;

a plurality of first parameter files stored in the database, each of the plurality of first parameter files including a plurality of control parameters required for the communications, the plurality of first parameter files respectively meeting the communication characteristics of the information carriers, the communication characteristics being respectively based on a plurality of standard communication specifications for the information carriers;

a plurality of second parameter files stored in the second database, each of the plurality of second parameter flies including a plurality of control parameters repaired for the communications, the plurality of second parameter files being based on one of the plurality of communication characteristics and respectively depending on at least one of: different manufacturers for the information carriers, and different circumstances under which the information carriers are used; and a retrieving unit configured to retrieve one of the plurality of first and second parameter files based on the transmitted information from the terminal apparatus to transmit the retrieved parameter file to the terminal apparatus through the communication network.

11. A reader/writer supporting system for supporting communications of a reader/writer with noncontact information carriers, the supporting system comprising:
a supporting apparatus comprising:
a plurality of first parameter files each including a plurality of control parameters required for the communications,
the plurality of first parameter files respectively meeting the communication characteristics of the information carriers, the communication characteristics being respectively based on a plurality of standard communication specifications for the information carriers;
a plurality of second parameter files each including a plurality of control parameters required for the communications,
the plurality of second parameter files being based on one of the plurality of communication characteristics and respectively depending on at least one of: different manufacturers for the information carriers, and different circumstances under which the information carriers are used;
a database configured to store a relationship between communication conditions and the plurality of first and second parameter files required for the communications, the communication conditions including:
communication standards adopted by the noncontact information carriers;
manufacturers by which the noncontact information carriers are manufactured;
statuses of use of the noncontact information carriers; and
communication distance ranges between the noncontact information carriers and the reader/writer; and
a terminal apparatus configured to transmit one of the communication conditions through a communication network,
wherein the supporting apparatus further comprises:
a retrieving unit configured to retrieve at least one of the plurality of first and second parameter files that corresponds to the one of the communication conditions transmitted from te terminal apparatus based on the relationship between the communication conditions and the plurality of first and second parameter files, thereby transmitting the at least one of the retrieved first and second parameter files to the terminal apparatus through the communication network.

* * * * *